VARIABLE ELECTRICAL IMPEDANCES

Filed Feb. 16, 1961 3 Sheets-Sheet 1

INVENTOR
DEREK H. MASH
Miles S. Pillars
ATTORNEY

July 13, 1965 D. H. MASH 3,194,967

VARIABLE ELECTRICAL IMPEDANCES

Filed Feb. 16, 1961 3 Sheets-Sheet 2

INVENTOR
DEREK H. MASH

ATTORNEY

July 13, 1965 D. H. MASH 3,194,967

VARIABLE ELECTRICAL IMPEDANCES

Filed Feb. 16, 1961 3 Sheets-Sheet 3

INVENTOR
DEREK H. MASH

ATTORNEY 3,194,967

VARIABLE ELECTRICAL IMPEDANCES

Derek Hubert Mash, Harlow, England, assignor to Associated Electrical Industries Limited, London, England, a British company Filed Feb. 16, 1961, Ser. No. 89,736
Claims priority, application Great Britain, Feb. 26, 1960, 6,865/60
3 Claims. (Cl. 250—211)

This invention relates to variable electrical impedances employing a photoconductive material.

Photoconductive materials, of which selenium and cadmium sulphide are well-known examples, change their electrical resistance in accordance with the intensity of light falling upon them. This material, which may be in the form of a powder, a sintered body of powder particles, a single crystal, or as a thin film formed, for example by evaporation, has a small quantity of copper, chlorine, or other elements added to it during its preparation to enhance or modify its photoconductivity.

Most variable electrical impedances, such as resistors, inductors, capacitors and other variable transformers, achieve the variation by means of a movable "wiper or brush" which makes mechanical and electrical contact with an impedance of fixed value at convenient points along its length or area. The need for a mechanical contact introduces many disadvantages—wear is caused, involving replacement of wipers, electrical noise may be introduced and considerable mechanical force has to be used to overcome the friction between the wiper and the impedance.

The present invention avoids these disadvantages, and consists of a variable circuit element comprising an impedance path having at least one electrically conducting member in contact therewith and one or more further electrically conducting members arrangement adjacent to said impedance path and separated therefrom by a body of photoconductive material, and means for producing a beam of light and for directing said beam on to a predetermined region of the body of photoconductive material to provide a low resistance electrical contact between the impedance path and the further conducting member(s).

Preferably, the variable impedance element has an infinite number of contact points and comprises an impedance path, with an electrical connection to each end, having a strip of conducting material arranged adjacent thereto, the gap between the strip and the path being filled with a body of photoconductive material.

Light from a source is directed upon the photoconductive material and ensures that there is a low resistance electrical contact between the conducting strip and the impedance path at any region to which the light is directed on to the layer of photoconductive material.

In order that the invention may be more readily understood it will now be described with reference to the accompanying drawings in which.

Figures 1, 2:
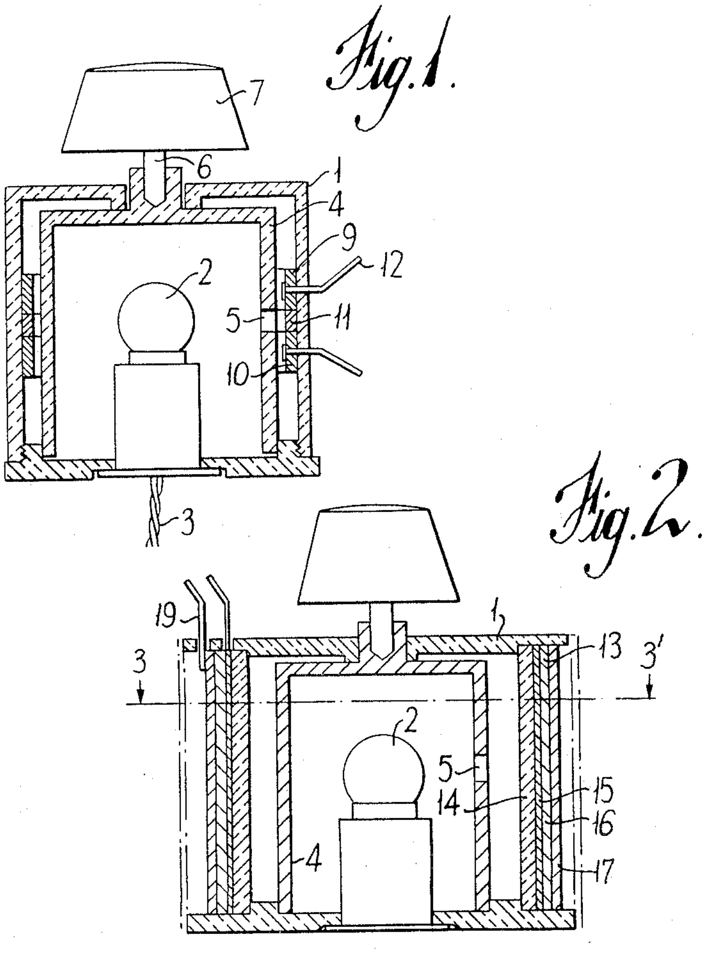
FIG. 1 is a sectioned side elevation of one embodiment of the invention.
FIG. 2 is a sectioned side elevation of a second embodiment of the invention.

Variable resistors are conveniently formed in accordance with the present invention as shown in the embodiment illustrated by FIG. 1. Reference numeral 1 denotes a light-tight box, substantially as the centre of which, a source of light of constant intensity is located. The light source is conveniently an electric incandescent lamp bulb 2 supplied with current through a pair of flexible conductors 3. The light source is surrounded by a cylindrical opaque screen 4 which is provided in one wall with a narrow vertical slit or aperture 5. The screen 4 is rotatable about its longitudinal axis within the light tight box 1 conveniently by means of a rotatable shaft 6 which is secured to the screen and extends through the top wall of the box. A knob 7 is attached to the outer end of the shaft to facilitate rotation of the shaft.

The impedance path which is reactive or resistive is provided with at least one electrically conducting member in contact therewith, and one or more further electrically conducting members are arranged adjacent to said impedance and are separated therefrom by a body of photoconductive material. The impedance path and the further electrically conducting member are conveniently in the form of strips 9 and 10 respectively each of which is bent into a portion of a cylinder and arranged in axial alignment with each other on the inner wall of the box 1. The strips are spaced apart and the space between them is filled with a body of photoconductive material 11 which is normally non-conductive.

The position of the aperture or slit 5 in the screen is so arranged that the light emanating from the slit is directed upon a predetermined region of the photoconductive material and establishes a low resistance electrical connection between the further electrically conducting member and the impedance path. The impedance path is provided at one or both ends with an electrically conducting member 12. The rotation of the beam of light causes the resistance between one of the conducting members 12 and the further conducting member 10 to vary.

Figure 3:
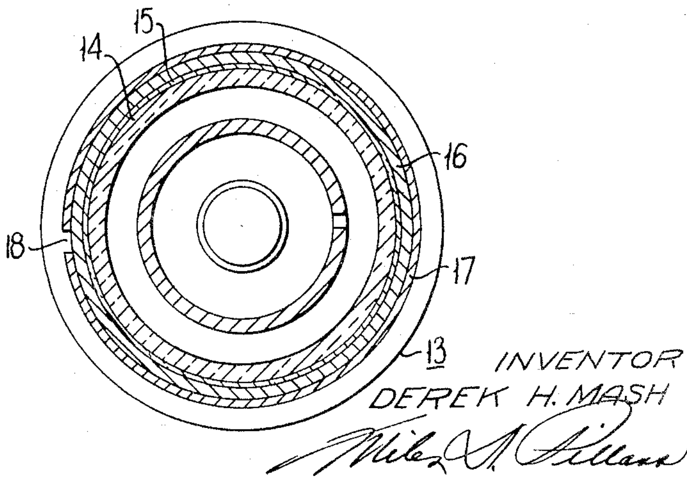
FIG. 3 is a plan view on the line 3—3' of FIG. 2.

A modified form of the invention is shown in FIGS. 2 and 3. The arrangement is particularly suitable as a variable resistor and in this case comprises a source of light, conveniently an incandescent electric lamp bulb 2 located at the centre of a composite cylinder 13. The cylinder comprises an inner cylinder 14 of light transmissive material, preferably glass, which supports on its outer surface an electrically conducting layer of light transmissive material 15. This layer in turn supports a layer of photoconductive material 16 and on the outside of the cylinder a layer of resistive material 17 forming the impedance path.

To prevent the impedance path from consisting of two paths in parallel, the resistive material is applied to only a part of the surface of the cylinder, a gap 18 being provided between the adjacent ends of the layer. One or both ends of the layer are provided with an electrically conducting terminal member 19.

A screen 4, having an aperture or slit 5 formed therein, as described above in connection with FIG. 1 is rotatably mounted between and concentric with, the composite cylinder and the source of light. Rotation of the screen illuminates a localized region on said body of photoconductive material and causes the resistance between one of the terminals 19 and the layer of light transmissive material 15 to vary.

The conducting layer of light transmissive material 15 which corresponds to the further conducting member 10 of the previously described embodiment, may be a thin film of gold supported on the cylinder 14 or alternatively if the cylinder is of glass, its outer surface may be rendered conductive as a stannic oxide film formed on the glass by a well known process. If the impedance path is purely resistive in nature, the film of light transmissive material may be formed with a sufficiently high resistance to act as the impedance path, in which case the composite cylinder of the above embodiment of the invention consists of an inner layer of light transmissive resistive film, a centre layer of photoconductive material and an outer layer of opaque conducting material.

Figure 5:
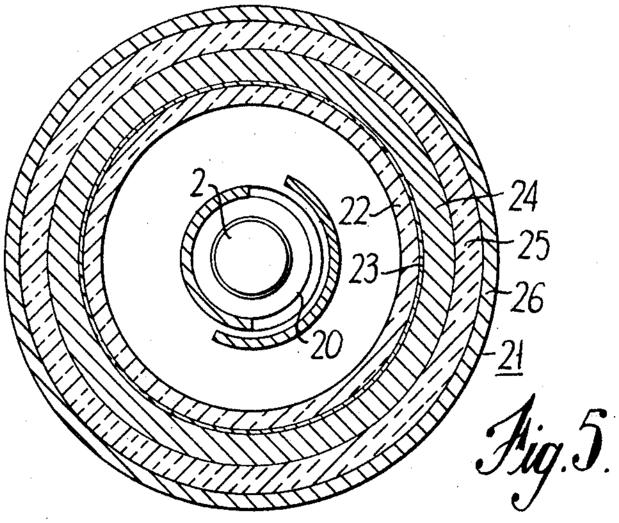
FIG. 5 is a sectioned plan view of the embodiment shown in FIG. 4.
Figure 4:
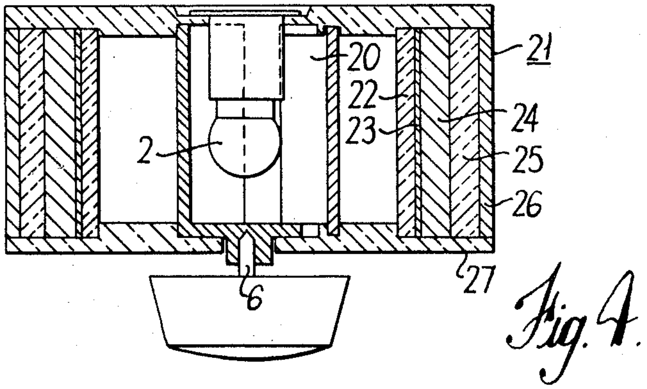
FIG. 4 is a sectioned side elevation of a further embodiment of the invention.

A further embodiment of the invention is illustrated in FIGS. 4 and 5. A variable capacitor comprises a source of light conveniently provided by an electric incandescent lamp bulb 2, enclosed by a diaphragm 20, and located concentrically within a composite cylinder 21. The cylinder comprises an inner cylinder of light transmissive material 22, preferably glass, which supports on its outer surface succeeding layers of a light transmissive conducting material 23, a photoconductive material 24, a dielectric material 25, and on the outside an opaque conducting material 26.

In an alternative arrangement, the composite cylinder comprises a cylinder of light transmissive conducting material, supporting on its outer surface succeeding layers of, light transmissive dielectric material, a photoconductive material, and on the outside, a layer of opaque conducting material.

The diaphragm 20 conveniently comprises two concentric semi-cylinders one of which is fixed and the other rotatable about its longitudinal axis. The rotatable semi-cylinder is secured to one end of a shaft 6 which extends through and is rotatably mounted in the upper end wall 27 of the composite cylinder.

Rotation of one semi-cylinder with respect to the other allows a widening beam of light to fall upon and illuminate the photoconductive material forming part of the composite cylinder. The action of the light illuminating the photoconductive material renders it conductive and establishes electrical contact between the conducting layers 23 and the dielectric material 25. As the width of the beam of light is varied, the area of the conducting layer 23 which is in contact with the dielectric material 25 varies and the capacity of the device is altered.

Figure 6:
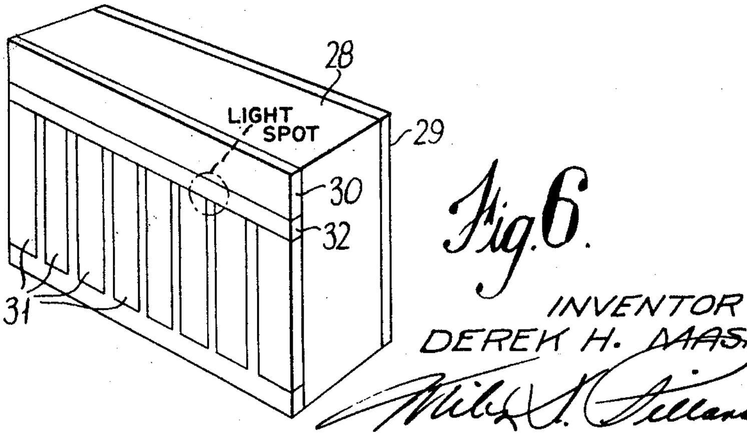
FIG. 6 is an isometric projection showing a still further embodiment of the invention.

In a still further embodiment of the invention (FIG. 6) a variable capacitor comprises a body or sheet of dielectric material 28 having a continuous electrically conducting member 29 in contact with one face thereof and an electrically conducting member 30 in contact with the opposite face of the sheet. At least one further electrically conducting member 31 is in contact with the same face of the body or sheet as conducting member 30 and is separated from the member 30 by a body of photoconductive material 32. A beam of light of variable width is allowed to illuminate a region of the photoconductive material and thereby connect at least one of the further conducting members 31 with the conducting member 30. The increase in the effective area of the conducting member 30 increases the capacity of the device. A diaphragm comprising a pair of opaque semi-cylinders as described above may be used to provide a beam of light of variable width.

The use of this invention enables electrical impedances to be varied over a wide range without resorting to movable contacts or "wipers" and thereby avoiding all the disadvantages associated therewith.

Figure 7:
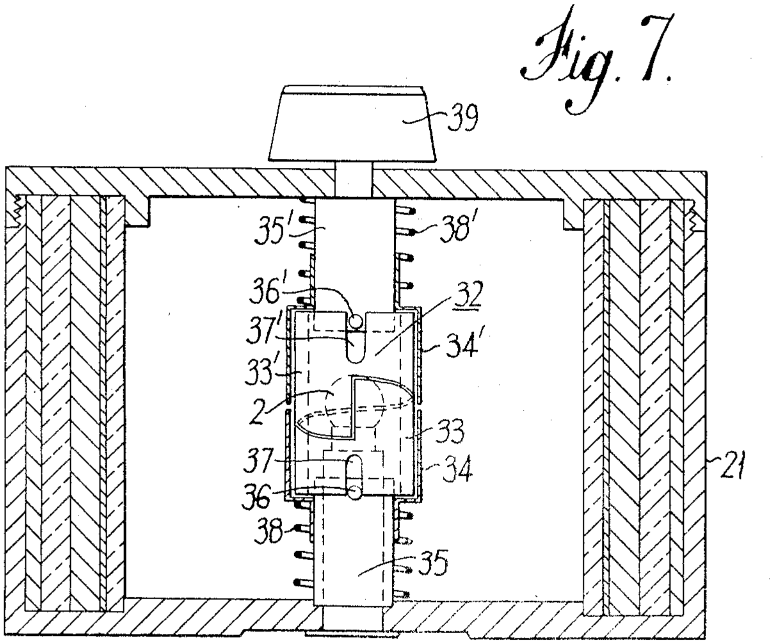
FIG. 7 is a partially sectioned view of a diaphragm in its closed position.
Figure 8:
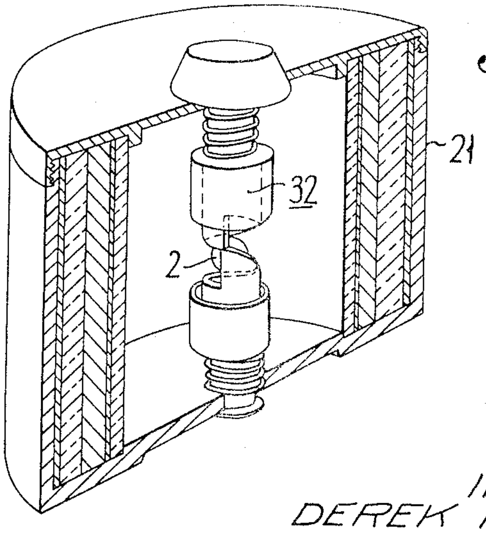
FIG. 8 is a pictorial view of the diaphragm shown in FIG. 7 when fully opened.

The diaphragm 20 may be conveniently replaced by the arrangement shown in FIGS. 7 and 8, as this arrangement enables an increased portion of the composite cylinder 21 to be used. The diaphragm 32 comprises a pair of transparent tubular members 33 and 33′ arranged in axial alignment coaxially with the electric incandescent lamp bulb 2. The adjacent surfaces of the members are in the form of inclined planes and are arranged such that if one member is rotated relative to the other, axial movement between the members is produced. When the members are in closed position as shown in FIG. 7, they are totally enclosed by a pair of opaque tubular shields 34 and 34′. The member 33 and the shield 34 are mounted on a rigid shaft 35 such that they may move axially along the shaft but are prevented from rotating relative thereto by means of a pin 36 which engages with a slot 37 in the member 33. Similarly the member 33′ and the shield 34′ are mounted on a rotatable shaft 35′ by means of a pin 36′ and a slot 37′. Springs 38 and 38′ keep the adjacent surfaces of the members 33 and 33′ in contact.

When the shaft 35′ is rotated by means of the knob 39, members 33′ and 33 are pushed axially apart against the action of the springs, taking the shields 34 and 34′ with them. The members 33 and 33′ may be rotated relative to each other by approximately 355° and this position is shown in FIG. 2.

What I claim is:

1. A variable capacitor comprising a composite member consisting of a cylinder of light transmissive vitreous material, a layer of light transmissive electrically conducting material supported on the outer surface of said cylinder, a layer of photoconductive material supported on said layer of conducting material, a layer of dielectric material supported on said layer of photoconductive material and a layer of opaque conducting material supported on said layer of dielectric material, a source of light located within said cylinder and means which enable a beam of light of variable width to be directed from said source on to said layer of photoconductive material to provide a conducting region between said layer of light transmissive material and said layer of dielectric material.

2. A variable capacitor comprising a composite member consisting of a cylinder of light transmissive vitreous material, a layer of light transmissive electrically conducting material supported on the outer surface of said cylinder, a layer of photoconductive material supported on said layer of conducting material, a layer of dielectric material supported on said layer of photoconductive material and a layer of opaque conducting material supported on said layer of dielectric material, a source of light located within said cylinder, and two opaque semi-cylinders concentric with said source and positioned between said source and said cylinder, one of said semi-cylinders being fixed and the other semi-cylinder being rotatable about its longitudinal axis to provide a variable gap between adjacent ends of said semi-cylinders to enable a beam of light of variable width to be directed from the source on to said layer of photoconductive material to provide a conducting region between said layer of light transmissive material and said layer of dielectric material.

3. A variable capacitor comprising a light-tight enclosure, a composite member located within said enclosure, said member consisting of a glass cylinder, a layer of light transmissive electrically conducting material supported on the outer surface of said cylinder, a layer of photoconductive material supported on said layer of conducting material, a layer of dielectric material supported on said layer of photoconductive material and a layer of conducting material supported on said layer of dielectric material, an electric incandescent lamp located within said cylinder and two opaque semi-cylinders concentric with said lamp and positioned between said lamp and said cylinder, one of said semi-cylinders being fixed and the other semi-cylinder being rotatable about its longitudinal axis to provide a variable gap between adjacent ends of said semi-cylinders to enable a beam of light of variable width to be directed from the lamp on to said layer of photoconductive material to provide a conducting region between said layer of light transmissive material and said layer of dielectric material.

(References on following page)

References Cited by the Examiner

UNITED STATES PATENTS

| | | | |
|---|---|---|---|
| 1,514,123 | 11/24 | Bacevicz | 250—211 X |
| 2,698,405 | 12/54 | True et al. | 317—253 |
| 2,873,415 | 2/59 | Nilsen | 317—253 |
| 2,896,086 | 7/59 | Wunderman | 250—211 |
| 2,945,956 | 7/60 | Frank | 250—217 X |
| 2,955,260 | 10/60 | Silvey | 338—15 |
| 2,965,867 | 12/60 | Greig | 338—15 |
| 2,985,844 | 5/61 | Wesch | 338—15 X |
| 3,033,073 | 5/62 | Shuttleworth | 250—211 X |
| 3,087,069 | 4/63 | Moncrieff-Yeates | 250—211 |
| 3,102,227 | 8/63 | De Gier | 250—209 X |

OTHER REFERENCES

Electronics, vol. 34, No. 32, August 11, 1961 (page 178).

RALPH G. NILSON, *Primary Examiner.*

ROY K. WINDHAM, WALTER STOLWEIN, *Examiners.*